Feb. 11, 1964   G. J. MARKOVICH   3,120,858
SPOOL VALVE ASSEMBLY

Filed Aug. 26, 1960   3 Sheets-Sheet 1

*INVENTOR.*
GEORGE J. MARKOVICH
*BY*
Oberlin, Maky & Donnelly
ATTORNEYS

Feb. 11, 1964   G. J. MARKOVICH   3,120,858
SPOOL VALVE ASSEMBLY
Filed Aug. 26, 1960   3 Sheets-Sheet 2

INVENTOR.
GEORGE J. MARKOVICH
BY
Oberlin, Maky & Donnelly
ATTORNEYS

Feb. 11, 1964    G. J. MARKOVICH    3,120,858
SPOOL VALVE ASSEMBLY
Filed Aug. 26, 1960    3 Sheets-Sheet 3

INVENTOR.
GEORGE J. MARKOVICH
BY
Oberlin, Maky & Donnelly
ATTORNEYS

3,120,858
SPOOL VALVE ASSEMBLY
George J. Markovich, Cleveland, Ohio, assignor to Parker-Hannifin Corporation, Cleveland, Ohio, a corporation of Ohio
Filed Aug. 26, 1960, Ser. No. 52,115
9 Claims. (Cl. 137—596.12)

The present invention relates generally as indicated to a spool valve assembly and, more particularly, to a spool valve assembly which, when installed in a hydraulic system including a pump, a double acting fluid motor, and a reservoir, provides not only the usual neutral position at which the pump output is bypassed to the reservoir and the motor components are retained in predetermined relative positions and two operating positions at which the bypass is closed and the motor components are moved relatively in opposite directions but, in addition, a so-called "float" position at which the pump output is again bypassed to the reservoir and the motor components are free to move with respect to each other, as under the influence of a load on one of said components.

Hitherto, in known spool valve assemblies it has been the practice to provide the float position at one end of the stroke of the spool adjacent one operating position and remote from the neutral position of the spool. As known in the art, the two operating positions of the spool, when used as with a double-acting piston and cylinder assembly, provide for actuation of the piston (or cylinder) in one direction to extend the assembly, or in the opposite direction to retract the assembly, whereas, in the float position the piston and cylinder are free to move relative to one another and the spool and valve housing have passages to accommodate the differential displacement of the head and rod ends of the cylinder. Furthermore, it is conventional to provide a spool centering spring that acts thereon normally to bias it to neutral position from either operating position. It is also known to provide detent mechanisms to yieldably hold the spool in one or both of its operating positions or in float position. In the case of a spool valve assembly having the usual spool centering spring and having a detent at the remote float position, the spool must be manually shifted from its adjacent operating position to the float position, whereat the spool will be held by the detent. Thus, with that arrangement it is not possible to simply release the spool from an operating position to the float position.

Accordingly, it is a principal object of this invention to provide improvements in a spool valve assembly in which the float position of the spring-centered spool is between the neutral position and one operating position, whereby a detent associated with the float position of the spool valve member is operative to arrest the movement of the spool at the float position as the spool is biased from said one operating position toward neutral position, whereby, as in the operation of a double-acting cylinder in which it is desired initially to lower the load, e.g., an emptied body of a dump truck, under power from extended condition and thence continue to lower the dump body by gravity in the float position of the spool, all that the operator of the dump truck has to do is to shift the spool to the desired operating position and thence release the spool whereby it automatically moves toward neutral, but such movement is arrested by the detent at the float position.

Another object of this invention is to provide a simplified valving and passage arrangement through the spool valve assembly for providing the desired neutral, operating, and float positions, with the last-named position being disposed between the neutral position and one operating position of the spool.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figures 2, 3:
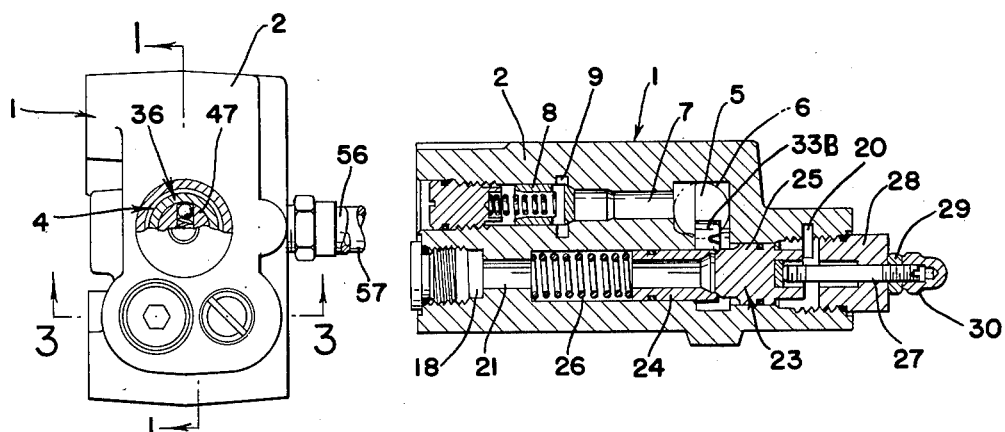
FIG. 2 is an end elevation view, partly broken away, of the spool valve assembly herein as viewed from the left-hand end of FIG. 1.
Figure 5:
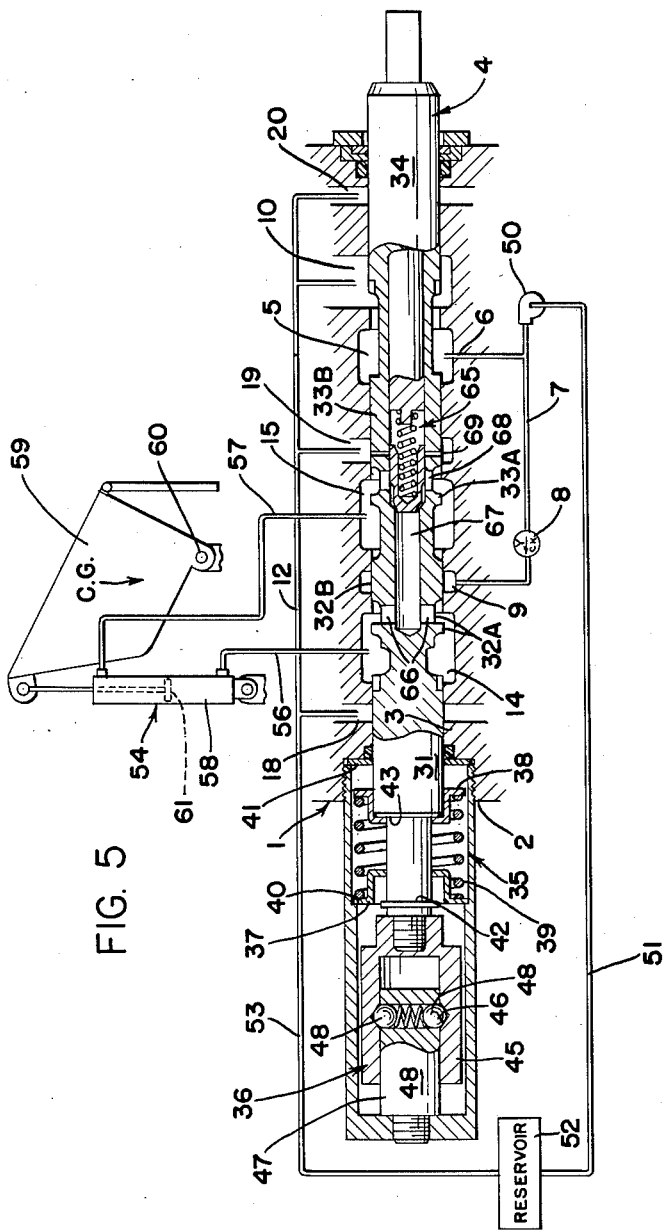

FIG. 3 is a cross-section view taken substantially along the line 3—3, FIG. 2; and FIGS. 4, 5, and 6 are schematic diagrams showing the spool of the assembly herein together with a double acting cylinder used for operating a dump truck body, the spool valve assembly being shown in one operating position to lower the dump body (FIG. 4), in the float position to permit gravity descent of the empty dump body (FIG. 5), and in the other operating position to raise the dump body and load therein (FIG. 6).

Figure 1:
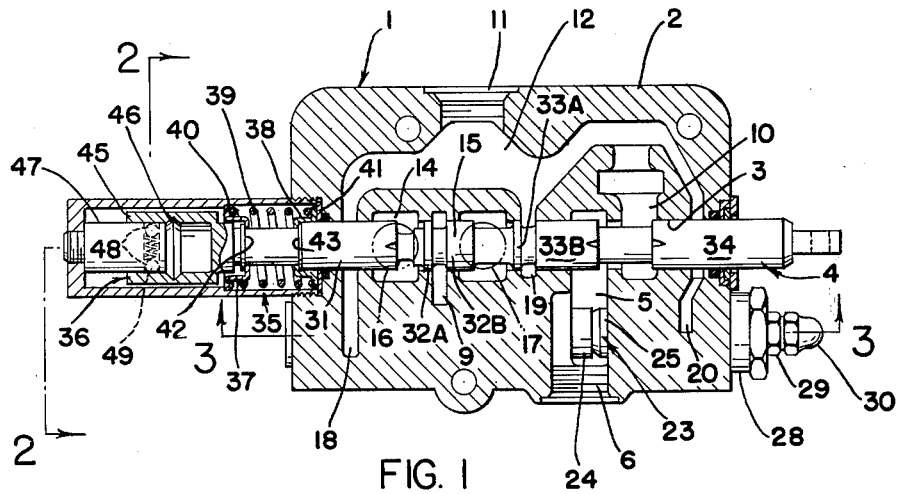
FIG. 1 is a cross-section view of a spool valve assembly embodying the present invention, such section having been taken substantially along the line 1—1, FIG. 2.

Referring now in detail to the drawings, and first to FIGS. 1, 2, and 3, the spool valve assembly 1 herein comprises a housing 2 with a bore 3 therethrough in which the spool 4 is axially slidably mounted. Intersecting the spool bore 3 is the pressure chamber 5 of the inlet port 6 which has a pressure feed passage 7 having a check valve 8 therein and terminating in a pressure feed chamber 9 also intersecting the spool bore 3 as best shown in FIG. 1. Adjacent the pressure inlet chamber 5 the spool bore 3 is intersected by the bypass chamber 10 which communicates with the tank port 11 of the valve housing 2 by way of the return passage 12, the tank port 11 being adapted for connection to a tank or reservoir. Also intersecting the spool bore 3 and straddling the pressure feed chamber 9 are a pair of service port chambers 14 and 15 which terminate in a pair of service ports 16 and 17 adapted to be connected as with the cylinder ports of a double-acting hydraulic piston cylinder assembly. Finally, the spool bore 3 is intersected by three return branches 18, 19, and 20, two of which (18 and 19) straddle the service port chambers 14 and 15, and the third one of which (20) is disposed adjacent the bypass branch 10. As evident, the return branches 18 and 20 prevent build-up of high pressure adjacent the ends of the spool 4 whereby the packings thereof are not subjected to high pressure at any time. The return branches 18, 19, and 20 have fluid communication with the return port 11 by way of the common return passage 12.

The pressure inlet chamber 5 also has a relief passage 21 leading therefrom to the tank port 11 via return branch 18 and return passage 12 and in that relief passage 21 there is disposed an adjustable relief valve assembly 23 including a spring-biased tubular relief valve member 24 which is seated against the seat plug 25 except when the fluid pressure in the pressure inlet chamber 5 builds up to a value exceeding the spring bias on said relief valve member 24. Adjustment of the compression of the spring 26 is effected as by means of the screw 27 which is threaded in the bushing 28 and which bears on the seat plug 25. The adjusting screw 27 is locked as by means of the nuts 29 and 30 as best shown in FIG. 3.

The spool 4 herein is formed with a series of four primary axially spaced apart lands 31, 32A—32B, 33A—33B, and 34 inclusive that cooperate with the passages and chambers intersecting the spool bore 3 for controlling the actuation of a double-acting piston cylinder assembly, or the like, adapted to be connected with the service ports 16 and 17 of the housing 2. One end of the spool 4 is adapted to have a control lever (not shown) pivotally connected thereto, and at the other end of the spool valve member there is provided the spring return mechanism 35 and a detent mechanism 36.

The spring return mechanism 35 is herein shown as comprising a pair of spring followers 37 and 38 between which a coil spring 39 is compressed, the spring followers 37 and 38 being respectively engaged with shoulders 40 and 41 fixed with respect to the housing 2, and as evident from FIG. 1 wherein the spool 4 is shown in its neutral position, movement thereof to the right will cause movement of the spring follower 37 through spool shoulder 42 with respect to the other spring follower 38 whereby the spring 39 is additionally compressed. Thus, when the spool 4 is released, the spring 39 will expand and restore the spool 4 to neutral position. Similarly, when the spool 4 is shifted toward the left, the spring follower 38 through spool shoulder 43 will move toward the spring follower 37 to additionally compress the spring 39, whereupon release of the spool 4 will permit expansion of the spring 39 and restoration of the spool 4 to netural position.

In the present case there is provided a detent mechanism 36 operative to yieldably retain the spool 4 in a so-called "float" position which is herein shown as being disposed between the neutral position and the left operating position of the spool 4. The detent mechanism 36 comprises a tubular screwed-in extension 45 of the spool 4 which is formed with an internal groove 46. Fixed with respect to the housing 2 is a detent carrier 47 in which detents 48, such as the balls shown, are mounted for radial outward movement under the influence of the spring 49 acting thereon when the groove 46 is brought into register with the detents 48. The detents 48 are held by spring 49 in position engaged in the groove 46 with sufficient force so that the return spring 39 will not be effective to return the spool 4 to neutral position when released from its left operating position.

The spool lands 31, 33B, and 34 are formed with V-shaped metering slots as shown for purposes well known in the art.

Referring now to the schematic diagrams of FIGS. 4, 5, and 6, there is shown a pump 50 which has its intake port connected by way of the conduit 51 with a tank or reservoir 52, and its discharge port connected to the inlet port 6 of the spool valve housing 2 leading to the pressure inlet chamber 5. From the pressure inlet chamber 5 there is the aforesaid feeder passage 7 having the check valve 8 therein, the outfall side of which is connected with the pressure feed chamber 9. The return branches 18, 19, and 20 and bypass passage 10 are all communicated by way of return passage 12 and conduit 53 to return fluid to the tank 52. Finally, the cylinder ports of a double-acting piston cylinder assembly 54 are connected by way of conduits 56 and 57 to the service ports and service port chambers 14 and 15 of the control valve assembly 1.

Now, as evident from FIG. 1 in which the spool 4 is shown in its neutral position, the land 32A—32B will be effective to block the flow of fluid to either end of the cylinder 58, but the fluid discharged by the pump 50 freely passes through the pressure inlet chamber 5 and bypass passage 10 whereby the pump 50 will operate under substantially no load, the fluid being recirculated therethrough and through the control valve assembly 1 and tank 52.

Herein the hydraulic double-acting cylinder 54 is arranged to actuate a dump truck body 59 to raise it to dump position when the cylinder 54 is extended as shown in FIG. 4, and to lower it to loading position when the cylinder 54 is retracted as shown in FIG. 6. It is to be noted that in the emptied dump position of said body 59 as shown in FIG. 4 its center of gravity C.G. may be directly above or to the right of the pivot 60 whereby it is required to apply fluid pressure to retract the cylinder 54 at least until the center of gravity is to the left of pivot 60 whereupon the body 59 may be allowed to descend by gravity to the load position shown in FIG. 6. Such gravity descent herein is provided for in the float position of the spool 4 as shown in FIG. 5.

Assuming that the cylinder 54 has been extended as in FIG. 4 to raise the body 59 to dump position, that the spool 4 has been allowed to be returned to the neutral position of FIG. 1 by the return spring 39, and that the dump truck operator wishes to lower the body 59, all that he has to do is to shift the spool 4 to the left as shown in FIG. 4.

When the spool 4 is thus shifted toward the left to the position shown in FIG. 4, so as to initiate retraction of the cylinder 54, the land 34 will close communication between the pressure inlet chamber 5 and the bypass passage 10 and at the same time the groove between lands 32B and 33A opens fluid communication between the pressure feed chamber 9 and the service port chamber 15 that is connected by way of conduit 57 to the rod end of the cylinder 58, whereby fluid under pressure delivered by the pump 50 flows through the check valve 8, the pressure feed passage 7 and chamber 9, the service port chamber 15 and conduit 57 into the rod end of the cylinder 58 to thereby cause the piston 61 to move downwardly. In this position of the spool 4, the groove between lands 31 and 32A establishes fluid communication between the service port chamber 14 and the tank port branch 18, whereby the fluid displaced from the head end of the cylinder 58 is returned to the tank 52 via the conduit 56, the service port chamber 14, the tank branch 18 and the return conduit 53.

In many cases it is necessary, as in material handling equipment, to move the piston 61 under power for only a portion of its return stroke, whereby it may be moved under the influence of the load or gravity, for the balance of the return stroke. It is for this and related purposes that the present valve assembly is provided with a float position.

When the spool 4 is in the position shown in FIG. 4 it will be seen that if the operator releases the spool 4, after the center of gravity of body 59 is to the left of pivot 60, the return spring 39 will tend to shift the spool 4 toward the right toward its neutral position. However, such return movement is arrested by the detent mechanism 36 whereby the spool 4, instead of returning to neutral position, is automatically stopped at the float position which is shown in FIG. 5. In that position, the bypass 10 and the pressure inlet chamber 5 will be in fluid communication whereby the pump 50 is unloaded. Also, in that position the land 32B blocks communication of the pressure feed chamber 9 with both service port chambers 14 and 15.

Inside the spool valve member there is provided a spring-biased check valve 65 which is unseated by the fluid displaced from the head end of the cylinder 58 as the piston 61 continues to move downwardly under the influence of the weight of the dump body 59 and by way of the radial passages 66 through the wall of the spool 4 from the groove between lands 32A and 32B and the axial passage 67. When the check valve 65 is thus unseated, fluid will flow through the radial passages 68 to the groove between lands 33A and 33B into the service port chamber 15 and through the conduit 57 into the rod end of the cylinder 58 to keep that end of the cylinder filled with fluid. Excess fluid from the head end of the cylinder 58 will be returned to the tank 52 via the orifices 69 in the land 33B of spool 4 which will be uncovered by the check valve 65 when the latter is forced to the right. As evident, these orifices 69 serve to build up a back pressure in both the conduits 56 and 57 for controlled continued movement of the piston 61 downwardly toward the head end of the cylinder 65 while maintaining both ends thereof completely filled with fluid. When the piston 61 reaches the end of its downward stroke in the cylinder 58, or reaches some other desired predetermined position, the operator may then manually shift the spool 4 toward the right and once the detents 48 have been disengaged from the groove 46, the centering spring 39 will move the spool to neutral position.

Finally, when the cylinder 54 is to be extended to raise the dump body 59 to dump position the spool 4 will be shifted toward the right to the position shown in FIG. 6. In that position of the spool 4 the communication between the pressure inlet chamber 5 and the bypass passage 10 will be blocked by land 33B and fluid under pressure will flow through the check valve 8 in the feeder passage 7 into the pressure feed chamber 9 and therefrom through the groove between lands 31 and 32A to the service port chamber 14 and conduit 56 into the head end of the cylinder 58. The fluid displaced from the rod end of the cylinder 58 will flow through the conduit 57, the service port chamber 15, the groove between lands 32B and 33A to the return branch 19 and thence through the return passage 12 and conduit 53 into the tank 52.

When the piston-cylinder assembly 54 has been extended to the desired extent, or when the piston reaches the end of its stroke, the operator merely releases the spool 4, whereupon the return spring 39 will move the spool 4 toward the left to its neutral position thereby unloading the pump 50 and locking the piston 61 and cylinder 58 in the desired extended position by reason of the blocking of the service port chambers 14 and 15.

It will, of course, be understood that, if desired, there may be provided a detent mechanism for yieldably holding the spool 4 in either or both of its operating positions as shown in FIGS. 4 and 6. This can be accomplished by providing other detent grooves in the spool extension 45 for cooperation with the detents 48 at one or both of such operating positions. Likewise, if desired, means may be provided for automatically releasing the detents from the spool holding position responsive to buildup of predetermined fluid pressure in the system or to predetermined extension or retraction of the piston cylinder assembly 54.

Other modes of applying the principle of the invention may be employed, change being made as regards the details described, provided the features stated in any of the following claims, or the equivalent of such, be employed.

I therefore particularly point out and distinctly claim as my invention:

1. In a spool valve assembly of the type comprising a housing having a bore in which a spool is reciprocable and having passages intersecting such bore to provide a neutral position of said spool whereat fluid communication is blocked between an inlet and a pair of outlets of said housing and fluid communication is established between said inlet and a bypass in said housing, and to provide at least one operating position of said spool when shifted axially in such bore whereat fluid communication is established between said inlet and one outlet, and fluid communication is blocked between said inlet and said bypass; said housing and spool being additionally formed to provide an inbetween float position whereat fluid communication is established, not only between said inlet and said bypass, but also between said outlets whereby fluid may flow from one outlet to the other as when they are connected with the ports of a double-acting fluid motor, and to provide a return passage which has restricted fluid communication with said outlets when said spool is in such float position whereby excess fluid displaced as by a differential displacement fluid motor flows through said return passage to effect a buildup of fluid pressure in such outlets.

2. In a spool valve assembly of the type comprising a housing having a bore in which a spool is reciprocable and having passages intersecting such bore to provide a neutral position of said spool whereat fluid communication is blocked between an inlet and a pair of outlets of said housing and fluid communication is established between said inlet and a bypass in said housing, and to provide at least one operating position of said spool when shifted axially in such port whereat fluid communication is established between said inlet and one outlet, and fluid communication is blocked between said inlet and said bypass; said housing and spool being additionally formed to provide an inbetween float position whereat fluid communication is established, not only between said inlet and said bypass, but also between said outlets whereby fluid may flow from one outlet to the other as when they are connected with the ports of a double-acting fluid motor, said spool being hollow and having a passage therein which, when said spool is in such float position, communicates said outlets with each other, said spool passage having a check valve therein to permit flow of fluid in one direction only from one outlet to the other.

3. The spool valve assembly of claim 2 wherein said spool is provided with an orifice which, when said spool is in such float position and when said check valve is open, establishes restricted communication between said outlets and a return passage in said housing whereby excess fluid displaced as by a differential displacement fluid motor flows through said orifice to effect a buildup of fluid pressure in such outlets.

4. In a spool valve assembly of the type comprising a housing having a bore in which a spool is reciprocable and having passages intersecting such bore to provide a neutral position of said spool whereat fluid communication is blocked between an inlet and a pair of outlets of said housing and fluid communication is established between said inlet and a bypass in said housing, and to provide two operating positions of said spool when shifted axially in opposite directions in such bore whereat fluid communication is established selectively between said inlet and either one of said outlets, and fluid communication is blocked between said inlet and said bypass; said housing and spool being additionally formed with a float position between said neutral position and one operating position whereat fluid communication is established not only between said inlet and said bypass but also between said outlets whereby fluid may flow from one outlet to the other as when they are connected with the ports of a double-acting fluid motor and to provide a return passage which has restricted fluid communication with said outlets when said spool is in such float position whereby excess fluid displaced as by a differential displacement fluid motor flows through said return passage to effect a buildup of fluid pressure in such outlets.

5. In a spool valve assembly of the type comprising a housing having a bore in which a spool is reciprocable and having passages intersecting such bore to provide a neutral position of said spool whereat fluid communication is blocked between an inlet and a pair of outlets of said housing and fluid communication is established between said inlet and a bypass in said housing, and to provide two operating positions of said spool when shifted axially in opposite directions in such bore whereat fluid communication is established selectively between said inlet and either one of said outlets, and fluid communication is blocked between said inlet and said bypass; said housing and spool being additionally formed with a float position between said neutral position and one operating position whereat fluid communication is established not only between said inlet and said bypass but also between said outlets whereby fluid may flow from one outlet to the other as when they are connected with the ports of a double-acting fluid motor, said spool being hollow and having a passage therein which, when said spool is in such float position, communicates said outlets with each other, said spool passage having a check valve therein to permit flow of fluid in one direction only from one outlet to the other.

6. The spool valve assembly of claim 5 wherein said spool is provided with an orifice which, when said spool is in such float position and when said check valve is open, establishes restricted communication between said outlets and a return passage in said housing whereby excess fluid displaced as by a differential displacement fluid motor flows through said orifice to effect a buildup of fluid pressure in such outlets.

7. In a spool valve assembly of the type comprising a housing having a bore in which a spool is reciprocable, the improvements which comprise providing said housing with the following passages that intersect said bore: a pressure inlet, a bypass adjacent said inlet, a pressure feed, a pair of outlets straddling said pressure feed, and a pair of returns straddling said outlets of which one return is disposed between one outlet and said pressure inlet; and providing a spool with alternate lands and grooves to cooperate with said passages to provide the following positions of said spool in said housing: a neutral position whereat fluid communication is established between said pressure inlet and said bypass and fluid communication is blocked from said pressure feed to both outlets, at least one operating position whereat fluid communication is blocked from said pressure inlet to said bypass and fluid communication is established between said pressure feed and one outlet and between the other outlet and the adjacent return, and an inbetween float position whereat fluid communication is established between said outlets and between said pressure inlet and said bypass and fluid communication is blocked from said pressure feed to both outlets; said spool having a passage therein communicating said outlets with each other in such float position of said spool; and a check valve in said spool passage to permit flow of fluid in one direction only from one outlet to the other in such float position of said spool.

8. The spool valve assembly of claim 7 wherein said spool has an orifice communicating said outlets with a return when said check valve is open and when said spool is in said float position to accommodate excess fluid as from a differential displacement fluid motor adapted to be connected with said outlets and to effect buildup of fluid pressure in said outlets.

9. In a spool valve assembly of the type comprising a housing having a bore in which a spool is reciprocable, the improvements which comprise providing said housing with the following passages that intersect said bore; a pressure inlet, a bypass adjacent said inlet, a pressure feed, a pair of outlets straddling said pressure feed, and a pair of returns straddling said outlets of which one return is disposed between one outlet and said pressure inlet; and providing a spool with alternate lands and grooves to cooperate with said passages to provide the following positions of said spool in said housing: a neutral position whereat fluid communication is established between said pressure inlet and said bypass and fluid communication is blocked from said pressure feed to both outlets, at least one operating position whereat fluid communication is blocked from said pressure inlet to said bypass and fluid communication is established between said pressure feed and one outlet and between the other outlet and the adjacent return, and an inbetween float position whereat fluid communication is established between said outlets and between said pressure inlet and said bypass and fluid communication is blocked from said pressure feed to both outlets; restricted communication being provided between said outlets and one return in the float position of said spool to accommodate excess fluid and to effect a buildup in fluid pressure as when a differential displacement fluid motor is connected with said outlets.

References Cited in the file of this patent
UNITED STATES PATENTS

| | | |
|---|---|---|
| 2,367,682 | Kehle | Jan. 23, 1945 |
| 2,646,025 | Deardorff | July 21, 1953 |
| 2,751,932 | Stueland | June 26, 1956 |
| 2,887,990 | Rogers | May 26, 1959 |
| 2,946,144 | Anderson | July 26, 1960 |
| 2,949,097 | Vander Kaay | Aug. 16, 1960 |
| 2,954,052 | Krehbiel | Sept. 27, 1960 |